United States Patent [19]

Gauthy et al.

[11] Patent Number: 5,494,962
[45] Date of Patent: Feb. 27, 1996

[54] THERMOPLASTIC COMPOSITION, PROCESS FOR ITS PREPARATION, AND USE

[75] Inventors: Fernand Gauthy, Wemmel; Eric Vandevijver; Ardéchir Momtaz, both of Brussels, all of Belgium

[73] Assignee: Solvay (Société Anonyme), Brussels, Belgium

[21] Appl. No.: 158,790

[22] Filed: Dec. 1, 1993

[30] Foreign Application Priority Data

Dec. 7, 1992 [BE] Belgium ................. 9201073

[51] Int. Cl.⁶ ................................................. C08L 23/00
[52] U.S. Cl. ........................... 525/193; 525/191; 521/134
[58] Field of Search ........................ 525/146, 153, 525/154, 149, 165, 177, 181, 189, 193, 191; 521/134

[56] References Cited

U.S. PATENT DOCUMENTS

| | | | |
|---|---|---|---|
| 4,212,787 | 7/1980 | Matsuda | 260/33.6 AQ |
| 4,395,517 | 7/1983 | Waniezek et al. | |
| 4,739,011 | 4/1988 | Kawata et al. | |
| 5,140,059 | 8/1992 | Simoens | 524/504 |

FOREIGN PATENT DOCUMENTS

| | | |
|---|---|---|
| 0024120A1 | 2/1981 | European Pat. Off. . |
| 0043022A1 | 1/1982 | European Pat. Off. . |
| 0210307A1 | 2/1987 | European Pat. Off. . |
| 0317359A2 | 5/1989 | European Pat. Off. . |
| 0440922A1 | 8/1991 | European Pat. Off. . |
| 0440923A1 | 8/1991 | European Pat. Off. . |

OTHER PUBLICATIONS

Society of Plastics Engineers—VII International Conference—1991, pp. 575–592 (Shell).
Advances in Polymer Technology, vol. 10, No. 3, pp. 163–172, 1990.
"Plastics Engineering", 2nd edition, R. J. Crawford, Pergamon Press (1987), pp. 3 and 4.

*Primary Examiner*—Vasu S. Jagannathan
*Attorney, Agent, or Firm*—Spencer & Frank

[57] ABSTRACT

Thermoplastic composition comprising at least:
  a polyolefin (A),
  a thermoplastic polymer (B), and
  at least one compound (C) derived from functional compound(s) (D) containing one or more groups chosen from carbon-carbon double and triple bonds and substituted carboxylic groups, obtained by melt blending the polymers (A) and (B) in the presence of the compounds (D).

14 Claims, 3 Drawing Sheets

THERMOPLASTIC COMPOSITION, PROCESS FOR ITS PREPARATION, AND USE

FIELD OF THE INVENTION

The present invention relates to a thermoplastic composition comprising at least one polyolefin and a thermoplastic polymer whose compatibilization is improved. The present invention also relates to a process for obtaining such a composition and to its use for the manufacture of objects using the extrusion, calendering, injection moulding and thermoforming processes.

TECHNOLOGY REVIEW

Polyolefins are polymers which are known for their mechanical, chemical and electrical properties. Their relatively low cost makes them a material of choice for a large number of applications such as, for example, the moulding of manufactured objects.

Since some applications require particular mechanical and rheological properties which the polyolefins taken individually do not possess, it may be found advantageous to blend them together or with other thermoplastic polymers. Unfortunately, since polymers are generally immiscible, simple blending produces heterophase compositions in which the dispersion of the minority phase is not sufficiently fine, homogeneous and stable. It is also found that the adhesion between the phases in these blends is not always sufficient to provide the whole with good mechanical properties. The performance of these compositions is consequently mediocre and their morphology is liable to be modified during any subsequent heat treatment. To overcome this disadvantage it is necessary to compatibilize the polymers, that is to say to lower the interfacial tension between the various polymer phases and to increase their adhesion. To do this it is possible to introduce compatibilizing agents into the mixture, these being synthesized in a separate stage and consisting of copolymers containing blocks which are compatible with each of the polymers respectively. Such compounds are difficult to obtain and are really efficient only in relatively high concentrations. As a result of this, such compatibilization is difficult to produce in an economical manner and generally gives rise to blends in which some performance characteristics are inferior to those of their constituent polymers [Society of Plastics Engineers—VII Internat. Conf.—1991, pages 575–592 (Shell)].

Compatibility between the polymers can also be increased by coupling their macromolecular chains. Such couplings can be obtained by introducing compounds capable of generating free radicals into the blend, as described, for example, in Advances in Polymer Technology, 10 (3), 163 (1990). According to this document satisfactory blends are obtained only on condition that polymers of closely related viscosities are employed. Furthermore, interfering reactions of depolymerisation or of preferential coupling of chains belonging to the same polymer are observed in such a process in addition to the desired coupling reactions between the macromolecular chains of each of the polymers. These interfering reactions result in sometimes considerable modifications in the properties of the initial polymers and the compositions thus obtained do not exhibit the desired performance.

Polyolefin-based compositions which do not exhibit the disadvantages of those described above have now been found.

SUMMARY OF THE INVENTION

To this end, the present invention relates to a thermoplastic composition comprising at least:
- a polyolefin (A),
- a thermoplastic polymer B), and
- at least one compound (C) derived from functional compound (s) (D) containing one or more groups chosen from carbon-carbon double and triple bonds and substituted carboxylic groups.

DETAILED DESCRIPTION OF THE INVENTION

Figure 1:
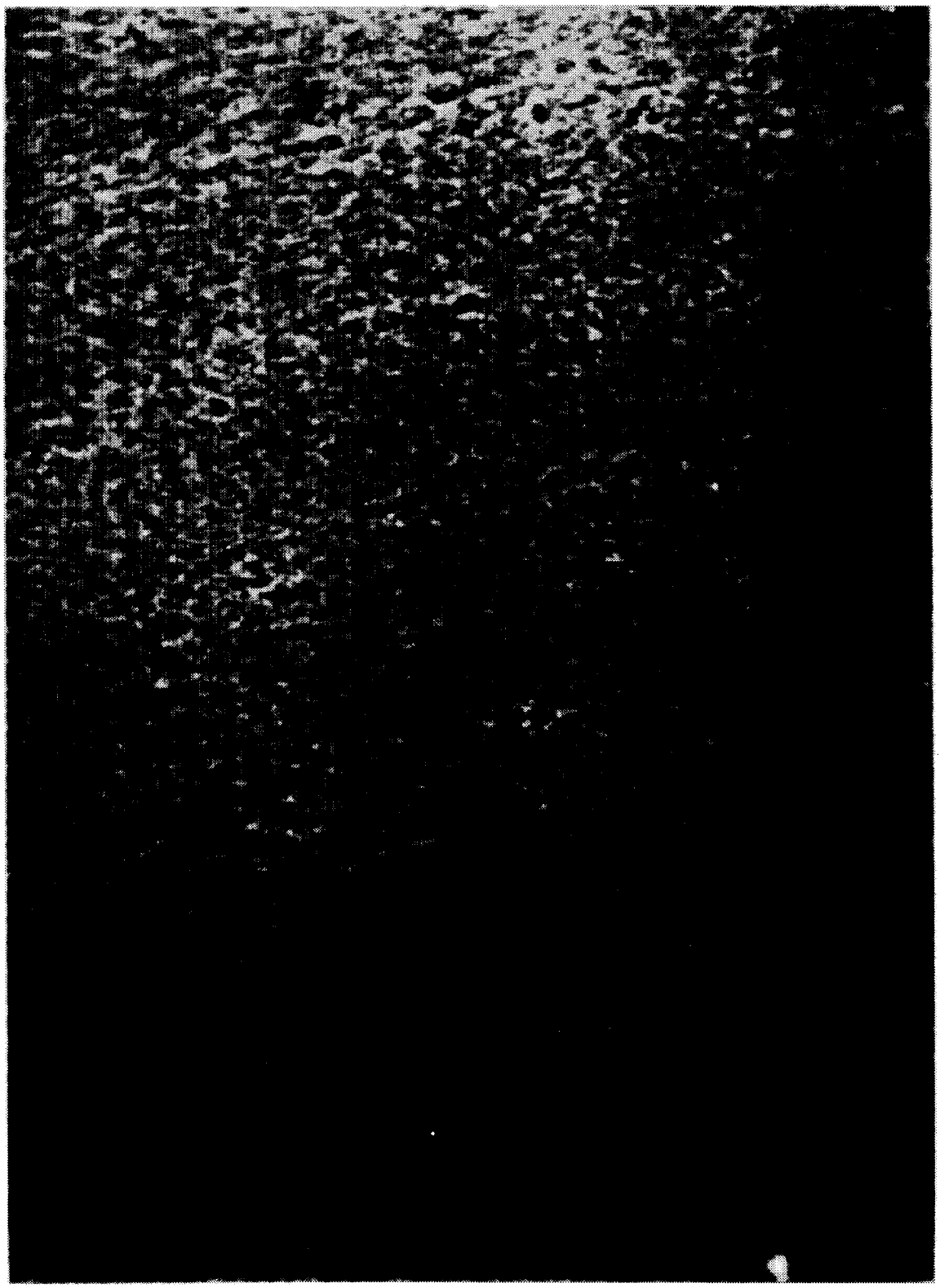
FIG. 1 illustrates a composition obtained directly from an extruder having a melt index, measured at 230° C. under 2.16 kg, of 0.73 g/10 minutes analyzed by phase contrast optical photomicrography at a magnification of 750 times (see Example 1).

Polyolefin (A) is intended to mean essentially the homopolymers and copolymers of alpha-olefins containing from 2 to 20 carbon atoms, such as, for example, ethylene, propylene, 1-butene, 1-pentene, 1-hexene, methyl-1-butenes, methyl-1-pentenes, 1-octene and 1-decene. Within the scope of the present invention the copolymers of the alpha-olefins described above with other unsaturated monomers such as unsaturated organic acids and their derivatives, vinyl esters, aromatic vinyl compounds, vinylsilanes and conjugated monocyclic and aliphatic diolefins, alicyclic diolefins which have an endocyclic bridge and conjugated aliphatic diolefins are also considered as polyolefins. By way of examples of these unsaturated monomers there may be mentioned acrylic acid, methacrylic acid, maleic acid, methyl methacrylate, glycidyl acrylate and methacrylate, maleic anhydride, vinyl acetate and butyrate, styrene and methylstyrene, vinyltrimethylmethoxysilane and γ-methacryloyloxypropyltrimethoxysilane, as well as 1,4-hexadiene, 4-vinylcyclohexene, dicyclopentadiene, methylene and ethylidenenorbornene, butadiene and isoprene. In most cases the polyolefins (A) belong to the group of partially or semicrystalline polymers such as defined, for example, in "Plastics Engineering" 2nd edition, R. J. CRAWFORD, Pergamon Press (1987), pages 3 and 4 and called more simply semicrystalline polymers hereinafter.

Among the abovementioned polyolefins those most frequently employed are ethylene, propylene and 1-butene homopolymers and the copolymers of these monomers preferably with one or more alpha-olefins such as described above. The preferred polyolefins of this type are the homoand copolymers of propylene and ethylene and more particularly the homo- and copolymers of propylene. In the case of the copolymers, these may additionally include other alpha-olefin comonomers such as, for example, hexene or 1-butene.

The compositions according to the present invention also include a thermoplastic polymer (B). This thermoplastic polymer (B) is generally chosen from polyolefins as defined above which are different from the polyolefin (A), vinyl chloride polymers, polyphenylene ethers, polyphenylene sulphides, polysulphones, polyketones, polyacetals, polyetherketones, polyamides, polyimides, polyesters, polystyrenes and polycarbonates. Thermoplastic polymers derived from monomers containing one ethylenic unsaturation, such as polyolefins, give good results. Compounds of this type which are also suitable are polyvinyl chlorides and polystyrenes.

The various thermoplastic polymers described above, their properties and the various processes which can be employed to obtain them are well known to a person skilled in the art and form part of the state of the art.

The thermoplastic polymer (B) employed is preferably a second polyolefin whose chemical composition is different from the chemical composition of the polyolefin (A). In most cases this thermoplastic polymer (B) forms part of polyolefins belonging to the group of the semicrystalline polymers as defined above. The compositions in which the thermoplastic polymer (B) is chosen from homopolymers and copolymers of alpha-olefins containing from 2 to 20 carbon atoms with a chemical composition differing from that of the polyolefin (A) give good results.

Polyolefins of different chemical compositions are also intended to mean polyolefins whose polymer chains contain one or a number of monomer units other than polyolefins derived from the same monomer units but in which the respective quantities of these monomer units and/or their distribution are different.

The polyolefin (A) and the thermoplastic polymer (B) preferably constitute a two-phase blend. Good results are obtained when the monomer unit which predominates by weight of the polyolefin (A) is different from that of the thermoplastic polymer (B).

The polyolefin (A) is preferably chosen from semicrystalline propylene homo- and copolymers, and the thermoplastic polymer (B) is chosen from semicrystalline ethylene homo- and copolymers. The compositions according to the invention preferably contain only one propylene polymer and only one ethylene polymer.

In addition to the polyolefin (A) and the thermoplastic polymer (B) the compositions according to the present invention also include at least one compound (C) derived from one or a number of functional compounds (D) containing one or more groups chosen from carbon-carbon double and triple bonds and substituted carboxylic groups.

As functional compounds (D) containing one or more carbon-carbon double or triple bonds there may be mentioned olefins, diene polymers and in particular liquid diene polymers and quinones. Concrete examples of olefins are aliphatic olefins such as 1-dodecene and 1-octadecene, aromatic olefins such as styrene, α-methylstyrene, 1,1-diphenylethylene, stilbene, phenylacetylene, vinylpyridine and vinylnaphthalene, aromatic di- and triolefins such as divinylbenzene, triallyl isocyanurate, unconjugated aliphatic diolefins such as 1,4-hexadiene, unconjugated monocyclic diolefins such as 4-vinylcyclohexene, alicyclic diolefins containing an endocyclic bridge, such as dicyclopentadiene, methylene- and ethylidenenorbornene and conjugated aliphatic diolefins such as butadiene or isoprene. Within the scope of the present invention olefins are also intended to mean alkyl and phenyl vinyl ethers.

Liquid polybutadiene may be mentioned as a liquid diene polymer.

1,2- and 1,4-benzoquinone, 2,6-dimethylbenzoquinone, 2-chloro-1,4-benzoquinone and chloranil may be mentioned as quinones.

Compounds (D) containing one or a number of substituted carboxylic groups are intended to mean the compounds containing at least one group as defined by the following formulae :

—COOR (I)

—COX (II)

—CONR$_1$R$_2$ (III)

—COYCO (IV)

In these formulae R denotes a hydrogen atom or an alkyl or aryl group containing from 1 to 20 carbon atoms, X denotes a halogen atom, each of R$_1$ and R$_2$ denotes, independently of one another, a hydrogen atom or an alkyl or aryl group containing from 1 to 10 carbon atoms, and Y denotes an oxygen atom or an NH group. Concrete examples of these compounds are carboxylic acids and their derivatives such as, for example, maleic anhydride, difluoromaleic anhydride, maleimide and its derivatives, and acrylic derivatives such as, for example, alkyl methacrylates and acrylonitrile.

Depending on the nature of the compound (C), two types of preferred compositions are distinguished within the scope of the present invention.

The first include at least one compound (C) derived from at least one functional compound (D) containing at least two conjugated carbon-carbon double bonds. Functional compounds (D) of this type which give good results are isoprene, butadiene, styrene, vinylpyridine and divinylbenzene. Divinylbenzene and styrene give good results. Divinylbenzene gives particularly good results.

The second include at least one compound (C) derived from at least two functional compounds (D) chosen from electron-donors and electron-acceptor compounds.

Electron-acceptor compounds which are preferably employed are maleic anhydride, alkyl maleates, alkyl acrylates and maleimides. Particularly preferred electron-acceptor compounds are maleic anhydride and alkyl acrylates. Electron-donor compounds preferably employed are styrene, divinylbenzene, butadiene, isoprene, vinyl acetate, acrylic and methacrylic anhydrides and methyl methacrylate. The particularly preferred electron-donor compounds are styrene and divinylbenzene. Particularly good results are obtained when the compound (C) is a derivative of styrene and of maleic anhydride. Good results are also obtained when the compound (C) is a derivative of divinylbenzene and of maleic anhydride. The compound (C) may also be a derivative of divinylbenzene and of an alkyl acrylate.

In the compositions according to the present invention the proportions of the various constituents (A), (B) and (C) depend on their precise chemical nature, on their physical and chemical properties and on the desired performance of the composition. In general the quantity of compound (C) is smaller than or equal to 60% by weight relative to the total weight of the composition. In most cases this quantity is smaller than or equal to 30% by weight and preferably smaller than or equal to 15% by weight. Particularly good results are obtained when the quantity of compound (C) is smaller than or equal to 10% by weight and more particularly smaller than or equal to 5% by weight. The minimum quantity of compound (C) can be very small. A favorable effect is observed already when this quantity is greater than or equal to 0.005% by weight, more particularly greater than or equal to 0.01% by weight relative to the total weight of the composition. Good results are obtained when this quantity is greater than or equal to 0.05% by weight, preferably greater than or equal to 0.5% by weight, relative to the total weight of the composition.

The respective quantities of the polyolefin (A) and of the thermoplastic polymer (B) are generally such that their weight ratio is from 0.01 to 100, preferably from 0.05 to 20 and more particularly from 0.1 to 10. When the compositions according to the invention contain a propylene polymer as polyolefin (A) and an ethylene polymer as thermoplastic polymer (B), it may be found that in some advantageous cases the polypropylene is the major constituent. The weight ratio of the polyolefin (A) to the thermoplastic polymer (B) is then from 1 to 100, in most cases from 1 to 20.

The compositions according to the present invention may contain other conventional additives such as, for example, stabilizers, lubricants, antistatic agents, nucleating agents, glass fibres or any other fillers usually employed in combination with the various constituents.

The compositions according to the present invention exhibit the many advantages described below. In general they contain few, and in most cases no, agglomerates that cannot melt when they are processed. These compositions also contain a remarkably fine and homogeneous dispersion of the polymer phases. In addition, this dispersion is also remarkably stable, that is to say that it is maintained in the melt in the absence of shear or kneading. Such a characteristic can make it possible to process the compositions according to the present invention many times without appreciable degradation in properties being observed.

It is also observed that the adhesion between the polymer phases is remarkably high, and this endows the compositions according to the invention with good mechanical properties.

Another advantage of the compositions according to the present invention is that the polymers of which they consist retain a large proportion of the initial properties. For example, no great change is observed in their viscosity or their melt index. The compositions according to the present invention consequently exhibit in most cases an optimum combination of the properties of their constituent polymers, a combination which, as already seen, is maintained during successive processing operations.

An additional advantage of the compositions according to the present invention is that, when processed, they do not give rise to the formation of agglomerates of higher viscosity which are liable to impair the properties of the objects thus obtained.

These various advantages are present even when the two polymers (A) and (B) exhibit very different viscosities.

Finally, it is also noted that, in some cases, chiefly when the polyolefin (A) is a propylene polymer and more particularly when the thermoplastic polymer (B) is an ethylene polymer, the compositions according to the present invention unexpectedly have particular rheological and viscoelastic properties. In particular, these compositions have a melt strength characterized by a high elongational viscosity at low shear rate. Also, in some cases the compositions according to the invention exhibit, in the melt, an increase in the resistance to deformation during elongation or extension. Such a phenomenon is generally called "tensile hardening" or "strain hardening".

These various advantages make the compositions according to the invention particularly advantageous for producing manufactured objects by injection moulding or by extrusion. In particular, the compositions according to the present invention which have the particular rheological properties described above are particularly well suited for the production of objects manufactured by extrusion or blow moulding, thermoforming or coating. These compositions are also particularly well suited for the production of foams. Such uses consequently constitute a second aspect of the present invention.

The conditions in which the compositions according to the present invention are obtained, constitute a third aspect of the present invention.

The compositions according to the present invention are obtained in a process involving melt-blending at least one polyolefin (A) with a thermoplastic polymer (B) in the presence of one or a number of functional compounds (D) containing one or a number of groups chosen from carbon-carbon double and triple bonds and substituted carboxylic groups. These compositions are furthermore generally obtained in the absence of any dispersant or solvent medium, that is to say as a melt.

In most cases, this melt blending is carried out in a conditions such that there is at least a partial reaction of the molecules of compounds (D) with each other and/or with the polymers (A) and/or (B) to form the derivative(s) (C).

The process for obtaining the composition according to the present invention preferably comprises only a single stage of melt-blending of the polymers (A) and (B) in the presence of the compound(s) (D).

The conditions in which this ending is performed are not critical, provided that they give rise to at least partial melting of the polymers (A) and (B). They are preferably such that there is complete melting of the constituents (A), (B) and (D). The temperature at which the melt blending is carried out is not critical provided that mixing occurs between the various constituents which are present in the molten state. This melt blending stage is generally performed at a temperature above the melting temperature of the constituent which has the highest melting temperature.

The temperature at which this blending is performed preferably does not exceed the decomposition temperature of the polymers (A) and (B). The work is generally carried out at a temperature which does not exceed 400° C., preferably not exceeding 300° C. and more particularly not exceeding 250° C. The minimum temperature at which the melt blending is performed is a function of the melting temperatures of the various constituents. It is generally higher than or equal to 100° C., preferably higher than or equal to 130° C. and more particularly higher than or equal to 150° C.

The blending period is chosen by taking into account the nature of the constituents processed and the blending temperature. This period generally varies from 5 seconds to 120 minutes, in most cases from 10 seconds to 30 minutes.

The respective quantities of the constituents (A), (B) and (D) which are processed are not critical. The following are used in most cases:

from 1 to 100 parts by weight of polyolefin (A), from 1 to 100 parts by weight of thermoplastic polymer (B) and from 0.005 to 100 parts by weight of functional compound(s) (D) per 100 parts of the total of the polyolefin (A) and of the thermoplastic polymer (B).

The quantity of functional compound (D) used to produce such blends is preferably greater than or equal to 0.01 part, more particularly greater than or equal to 0.02 parts by weight per 100 parts of the total polyolefin (A) and polymer (B). Good results are obtained when this quantity is greater than or equal to 0.1 part by weight. This quantity is generally smaller than or equal to 60 parts by weight, preferably smaller than or equal to 30 parts by weight per 100 parts of the total polyolefin (A) and polymer (B). Particularly good results are obtained when the quantity of functional compound (D) is smaller than or equal to 15 parts by weight and more particularly smaller than or equal to 10 parts by weight.

When an electron-donor and electron-acceptor compound are used as functional compounds (D), the respective quantity of these compounds is not critical provided that the total quantity of functional compound used is adhered to. It may nevertheless be desirable to use these two functional compounds (D) in molar ratios close to unity. In general the molar ratio of the electron-donor compound to the electron-acceptor compound varies from 0.5 to 2, preferably from 0.7 to 1.5 and more particularly from 0.8 to 1.2.

The respective quantities of polyolefin (A) and thermoplastic polymer (B) used in the process according to the present invention are such that their weight ratio is from 0.01 to 100, preferably from 0.05 to 20 and more particularly from 0.1 to 10. When a propylene polymer is used as polyolefin (A) and an ethylene polymer as polymer (B) it may be found advantageous to use them in weight ratios from 1 to 20.

To perform the blending it is possible to employ any of the known devices for this purpose. It is thus possible to work equally well with mixers of external or internal type. Mixers of internal type are those most appropriate and, among these, noncontinuous mixers of Brabender type and continuous mixers such as extruders. The mixing may be performed in the usual conditions which are well known to a person skilled in the art.

The order of introduction of the constituents into the mixer is not critical. They can be introduced equally well separately and successively or a premix may be produced of the polyolefin (A) with the thermoplastic polymer (B) or with compound (D), of the thermoplastic polymer (B) with the compound (D) or else of the polymers (A) and (B) and of the compound (D) simultaneously.

A compound capable of generating free radicals is also generally used in the process of the invention.

Examples of such compounds are halogenated imides such as, for example, N-bromosuccinimide, organic peroxides such as benzoyl and dicumyl peroxide, cumene hydroperoxide, 2,5-dimethyl-2,5-di-tert-butylperoxyhexane, persulphates such as potassium or ammonium persulphates and diazo compounds such as asobisisobutyronitrile and the like. The compounds capable of generating free radicals are preferably chosen so that they decompose at the temperatures at which the melt blending is performed.

When such compounds are employed they are used in quantities smaller than or equal to 1 part by weight per 100 parts of the total of the polyolefin (A) and of the thermoplastic polymer (B), perferably smaller than or equal to 0.5 parts and more particularly smaller than or equal to 0.1 part by weight per 100 parts of the total of the polyolefin (A) and of the thermoplastic polymer (B). These compounds are generally used in quantities greater than or equal to 0.0025 parts, preferably greater than or equal to 0.005 parts and more particularly greater than or equal to 0.01 part per 100 parts of the total of the polyolefin (A) and of the thermoplastic polymer (B).

The process according to the present invention has the advantage of being particularly simple to use. It also makes it possible to obtain the thermoplastic compositions described above in a reproducible manner and within particularly short periods of time.

EXAMPLES

The following examples serve to illustrate the invention.

Example 1

An extruder of MDK/E46B type marketed by Buss is arranged so that the main body includes the three successive zones listed below.

zone 1: zone for introducing and blending the reactants zone 2: central reaction zone zone 3: zone equipped with a vent permitting the degassing of the unreacted reactants.

Zone 2 is isolated from zones 1 and 3 by two restriction rings.

This extruder is fed at a rate of 10 kg/h with a mix containing, per kilogram: 678.5 g of polypropylene with a melt index of 1 g/10 min, measured according to ISO standard 1133 at 230° C. under 2.16 kg, and marketed under the name Eltex®P HF001 P by SOLVAY S. A. (polyolefin (A)), 291 g of polyethylene with a melt index of 1.8 g/10 min, measured according to ISO standard 1133 at 190° C. under 2.16 kg and marketed under the name Eltex B 4020 P by SOLVAY S. A. (thermoplastic polymer (B)), 30 g of maleic anhydride, 0.5 g of 2,5-dimethyl-2,5-di-tert-butyl-peroxyhexane (DHBP).

38 g of styrene per kg of mix are introduced into zone 2 with the aid of a metering pump. The injector is placed 280 mm from the main feed of the extruder.

The extrusion conditions are: temperature of the heating oil co-kneader screw: 160° C.

zones 1 and 2: 220° C.

zone 3 and granulation screw: 200° C. rates of rotation of the screws co-kneader screw: 150 rev/min granulation screw: 15 rev/min.

The composition obtained, whose melt index, measured at 230° C. under 2.16 kg, is 0.73 g/10 min is analysed by a phase contrast optical photomicrography at a magnification of 750×(FIG. 1). The minority phase (polyethylene) is in the form of small-sized nodules (1 to 2 μm) which are distributed in a remarkably homogeneous manner. The morphological stability of this composition is analysed as described below.

A micrographic section is placed on a hotplate and subjected to the following temperature programme:

rise in temperature up to 200° C. at a rate of 20° C./min, hold at 200° C. for 5 min, decrease in temperature to room temperature at a rate of 3° C./min.

Figure 2:
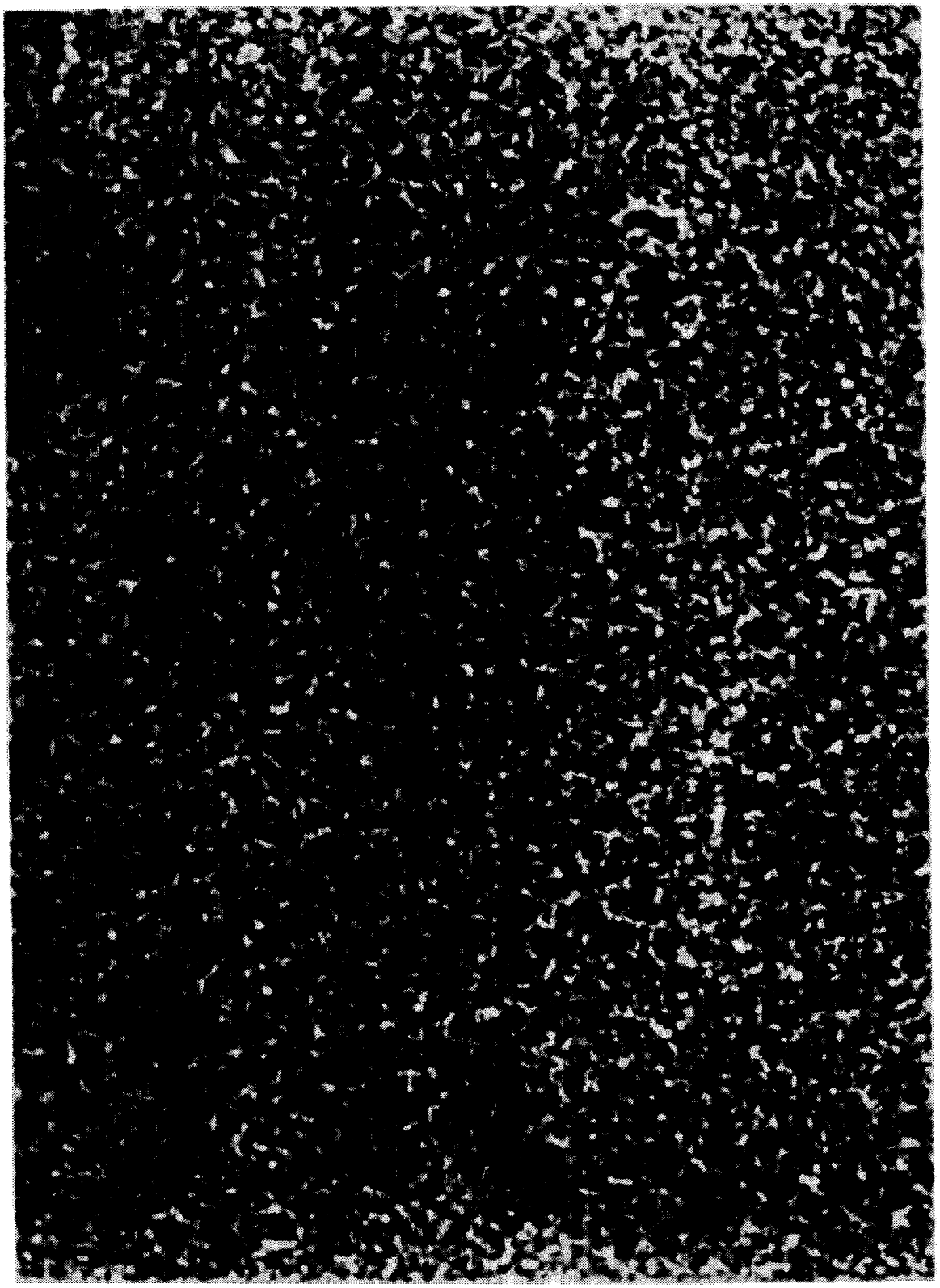
FIG. 2 illustrates a composition subjected to a heat treatment (see Example 1) having a similar appearance, using phase contrast optical photomicrography, to the composition resulting directly from the extruder (identical nodule size and homogeneous module distribution) illustrated in FIG. 1.

Using phase contrast optical photomicrography (FIG. 2) it is observed that the composition resulting from this treatment is similar in appearance to the composition resulting directly from the extruder (identical nodule size and homogeneous nodule distribution).

Figure 3:
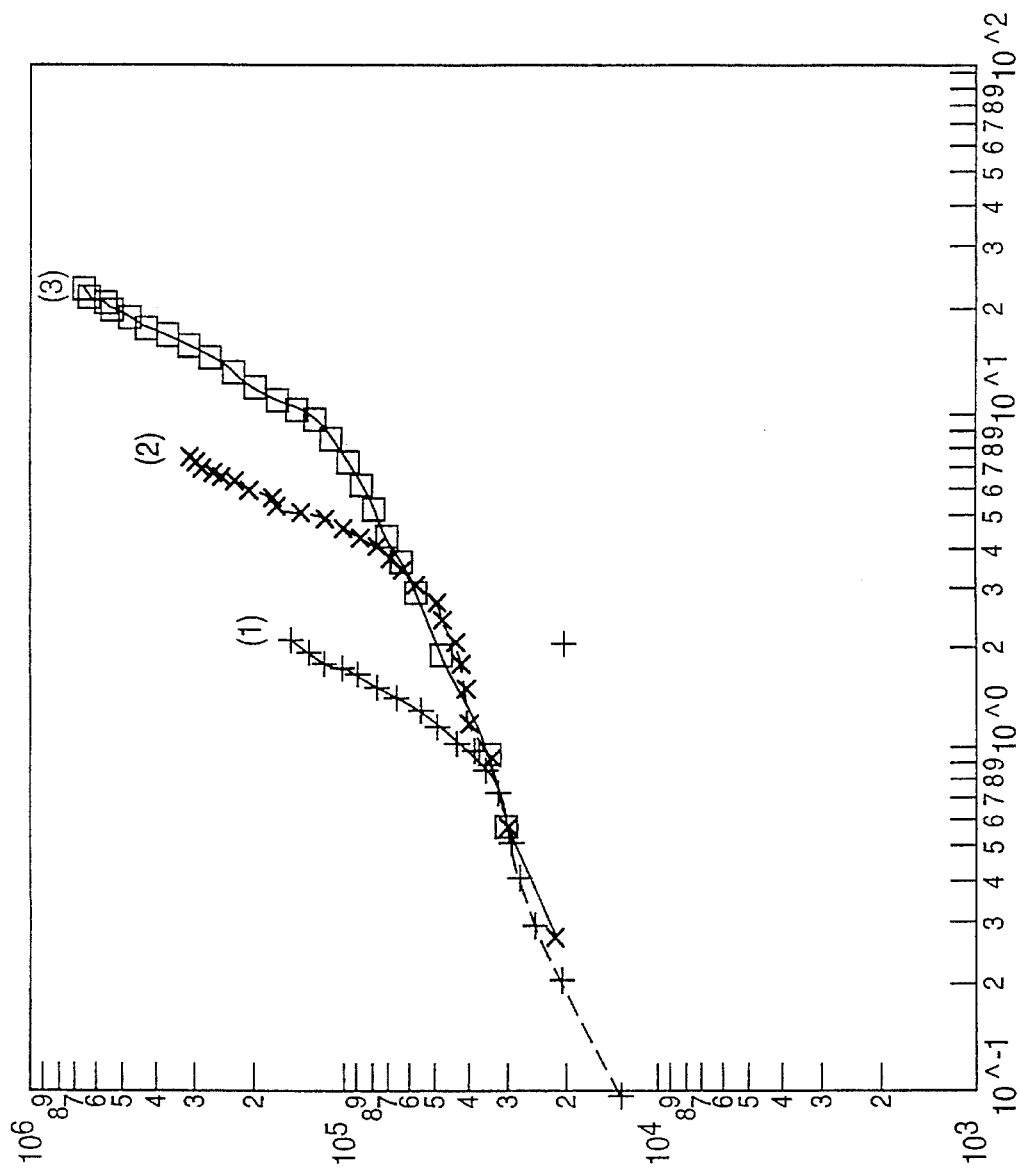
FIG. 3 illustrates the elongational viscosity of the composition resulting from the extruder, determined by a rheometer, see Example 1.

The elongational viscosity of the composition resulting from the extruder is determined by means of a rheometer marketed by Rheometrics under the name Rheometrics Extensional Rheometer RER-9000 (FIG. 3). Curves in this figure, taken at 190° C., reproduce the variation in elongational melt viscosity (expressed in Pa s) as a function of time (expressed in s) at elongation rates (expressed in s$^{-1}$) of 1 (curve (1)), 0.3 (curve (2)) and 0.1 (curve (3)). It can be seen in this figure that when the composition is subjected in the molten state to an elongation at a constant shear rate the elongational viscosity increases to a maximum before brittle fracture of the sample. Strain hardening therefore takes place, followed by a brittle fracture.

Example 2

Example 1 is repeated, but using a mixture containing, per kilogram, 692.5 g of polypropylene, 297 g of polyethylene, 0.5 g of DHBP and 10 g of maleic anhydride. 12 g of styrene per kg of mixture are introduced into zone 2.

The composition thus obtained has a melt index of 3.2 g/10 min at 230° C. under 2.16 kg and has a homogeneous phase dispersion, the mean nodule size of the minority phase being between 3 and 4 μm. Again, no significant modification of this dispersion is observed during the heat treatment described in example 1.

Example 3R

This example is given by way of comparison.

Example 1 is reproduced but the introduction of DHBP, maleic anhydride and styrene are omitted. A composition whose melt index is 2.6 g/10 min is then obtained. The phase dispersion is homogeneous, the minority phase being in the form of nodules from 3 to 4 μm.

During the heat treatment described in example 1 a coalescence of the minority phase is observed. The latter is then in the form of nodules of variable sizes which may be larger than 20 μm, distributed nonuniformly.

Example 4 and 5

Compositions are prepared by reproducing example 1 except in so far as the nature of the polymers used and their respective quantities are concerned.

A mixture containing the following is used in example 4:

694.6 g of Eltex P HF001P polypropylene (polyolefin (A)), 298 g of polystyrene with a melt index, measured according to ISO standard 1133 under 5 kg and at 200° C., of 1.3 g/10 min marketed under the name Gedex® 1070 by ATOCHEM (thermoplastic polymer (B)), 7 g of maleic anhydride, and 0.4 g of DHBP.

13 g of styrene per kg of mixture are introduced into zone 2.

A mixture containing the following is used in example 5:

684.6 g of Eltex P HF001P polypropylene (polyolefin (A)), 294 g of Gedex 1070 polystyrene (thermoplastic polymer (B)), 21 g of maleic anhydride, and 0.4 g of DHBP.

37 g of styrene per kg of mixture are introduced into zone 2.

Compositions are thus obtained in which the minority phase is in the form of nodules of sizes smaller than 4 μm in the case of example 4, and smaller than 6 μm in the case of example 5. The melt indices, measured at 230° C. under 2.16 kg, are 5.1 g/10 rain in the case of composition 4 and 2.6 in the case of composition 5. In both compositions the nodules are distributed homogeneously.

Example 6R

This example is given by way of comparison.

The comparative example 3R is reproduced with a composition containing, per kilogram, 700 g of Eltex P HF001P polypropylene and 300 g of Gedex 1070 polystyrene. This composition exhibits nodules of sizes larger than 20 μm. The adhesion between the phases is low and a delamination is observed during granulation.

Examples 7 and 8 and 9R

Examples 7 and 8 serve to illustrate the invention. Example 9R is given by way of comparison.

Into a noncontinuous internal mixer of Plasticorder PL 2000-3 type, equipped with a WBOE kneader marketed by the Brabender company are introduced 50 g of a mixture containing Eltex P HY202 polypropylene, Gedex 1070 polystyrene and, optionally, one or a number of functional agents (D) and DHBP.

The blending conditions are: p1 temperature: 210° C.

stirring speed: 50 rev/min, time: 15 minutes

The quantities used, the nature of the compound(s) (D) and the characteristics of the compositions thus obtained are reproduced in Table I below.

TABLE I

|  | Examples | | |
|---|---|---|---|
|  | 7 | 8 | 9R |
| Mixture composition | | | |
| Polypropylene (g/kg) | 731.7 | 712.7 | 750 |
| Polystyrene (g/kg) | 244 | 238 | 250 |
| DHBP (g/kg) | 0.3 | 0.3 | — |
| Compound(s) (D) | | | |
| Divinylbenzene (g/kg) | 24 | 30 | — |
| Maleic anhydride (g/kg) | — | 19 | — |
| Characterization of the compositions | | | |
| Adhesion between phases | good | good | bad |
| Minority phase nodule size (μm) | 11 | 16 | 45 |

What is claimed is:

1. A thermoplastic composition, comprising:

a polyolefin (A) selected from a group consisting of semicrystalline homopolymers and copolymers of propylene, a second polyolefin (B) different from said polyolefin (A) and selected from a group consisting of semicrystalline homopolymers and copolymers of ethylene, and at least one compound (C) selected from a group consisting of compounds derived from at least one functional compound (D) containing at least two conjugated carbon-carbon double bonds and compounds derived from at least two functional compounds (D) selected from electron-donor and electron-acceptor compounds.

2. The composition according to claim 1, wherein the compound (C) is derived from divinylbenzene.

3. The composition according to claim 2, wherein the polyolefin (A) is chosen from semicrystalline homo- and copolymers of propylene and the second polyolefin (B) is chosen from semicrystalline homo- and copolymers of ethylene.

4. The composition according to claim 1, wherein the compound (C) is derived from styrene and maleic anhydride.

5. The composition according to claim 1, wherein the compound (C) is derived from divinylbenzene and maleic anhydride.

6. The composition according to claim 1, wherein the quantity of compound (C) varies from 60 to 0.005% by weight relative to the total weight of the composition.

7. The composition according to claim 1, wherein the respective quantities of the polyolefin (A) and of the second polyolefin (B) are such that their weight ratio is from 0.01 to 100.

8. The composition according to claim 1, wherein the respective quantities of the propylene polymer (A) and of the ethylene polymer (B) are such that their weight ratio is from 1 to 20.

9. The composition according to claim 1, prepared by melt blending at least one polyolefin (A) with a second polyolefin (B) in the presence of at least one functional compound (D).

10. The composition according to claim 9, wherein said melt blending consists of one polyolefin (A) and one second polyolefin (B).

11. In an object manufactured by extrusion or blow moulding, thermoforming or coating, the improvement comprising a composition according to claim 1.

12. In a forming foam, the improvement comprising a composition according to claim 1.

13. A composition according to claim 1, comprising a single stage of melt blending of at least one polyolefin (A) with a second polyolefin (B) in the presence of one or a number of functional compounds (s) (D).

14. The composition according to claim 13, wherein the following are used:

from 1 to 100 parts by weight of polyolefin (A), from 1 to 100 parts by weight of polyolefin (B), and from 0.05 to 100 parts by weight of functional compound(s) (D) per 100 parts of the total of the polyolefin (A) and of the second polyolefin (B).

* * * * *